United States Patent

Rockwell et al.

[11] Patent Number: 6,055,010
[45] Date of Patent: Apr. 25, 2000

[54] METHOD AND APPARATUS FOR CONTROLLING OPERATION OF A PRINTER

[75] Inventors: Thomas L. Rockwell, Rochester; Thomas C. Weaver, Sodus, both of N.Y.

[73] Assignee: Eastman Kodak Company, Rochester, N.Y.

[21] Appl. No.: 09/105,745

[22] Filed: Jun. 26, 1998

[51] Int. Cl.[7] .................................................. H04N 1/053
[52] U.S. Cl. .................... 347/250; 347/235; 347/243; 347/260; 359/212; 359/216
[58] Field of Search .................... 347/234, 235, 347/243, 248, 250, 260, 259, 246; 369/97; 359/212, 213, 216, 217, 218, 226

[56] References Cited

U.S. PATENT DOCUMENTS

| | | | |
|---|---|---|---|
| 4,429,218 | 1/1984 | Thomas | 250/214 R |
| 4,803,367 | 2/1989 | Murase et al. | 250/236 |
| 4,980,549 | 12/1990 | Baldwin | 250/235 |
| 5,023,448 | 6/1991 | Kessler et al. | 250/235 |
| 5,153,604 | 10/1992 | Tutiyasu | 347/251 |
| 5,278,405 | 1/1994 | Zelenka | 250/235 |
| 5,289,000 | 2/1994 | Toyofuku | 250/234 |
| 5,357,106 | 10/1994 | Wilson | 250/236 |
| 5,424,538 | 6/1995 | Yoshino | 250/235 |
| 5,426,528 | 6/1995 | Yamamoto et al. | 359/204 |
| 5,463,410 | 10/1995 | Uchiyama et al. | 347/246 |
| 5,627,670 | 5/1997 | Minoura et al. | 359/212 |
| 5,710,751 | 1/1998 | Hoover et al. | 369/97 |

FOREIGN PATENT DOCUMENTS 2249203  4/1992  United Kingdom.

*Primary Examiner*—N. Le
*Assistant Examiner*—Hai C. Pham
*Attorney, Agent, or Firm*—Frank Pincelli

[57] ABSTRACT

A printer for use in exposing a photosensitive material and method of operation thereof. The printer includes a rotatable polygon mirror having a plurality of adjacent facets. The mirror includes a reference facet and signal generator for generating a polygon index signal which defines a reference position. A light source for directing a light beam is provided for reflection of the beam off each of the adjacent facets for exposing the photosensitive material and defining a writing path. A sensor is also provided for generating a line start signal for each of the facets in response to the light beam passing over the sensor. The printer is provided with a switch for placing printer in a first set-up mode or writing mode. When in set-up mode a counter measures a first time period $T_S$ from the polygon index signal to a first line start signal generated by the reference facet. A counter also measuring a second time period $T_{LS}$ from a line start signal to the next line start signal generated from the next adjacent facet of the rotatable polygon mirror. A first facet synch signal $T_{RI}$ is determined using the first time period $T_S$ from said reference facet. $T_{RI}$ and $T_{LS}$ are stored in memory. The printer turns on and off the light source in a controlled manner from the information obtained during the set-up mode.

5 Claims, 4 Drawing Sheets

METHOD AND APPARATUS FOR CONTROLLING OPERATION OF A PRINTER

FIELD OF THE INVENTION

The present invention relates to printers which use a light beam and a polygon mirror for writing onto a photosensitive medium.

BACKGROUND OF THE INVENTION

High speed printers frequently use a rotating device to scan a writing beam across a photosensitive medium. In such devices it is important to control the writing beam to prevent corruption of the photosensitive media. Thus, it is important to know and ensure the appropriate activation of the writing beam just prior to writing of the image or information on the photosensitive medium and turning off the writing beam when the information has been completely written down. To ensure acceptable output, a mechanism is used to generate a timing pulse just prior to a detector for enabling the writing beam to excite the detector.

In prior art printers which utilize a laser beam and a rotating polygon mirror, in order to set-up this timing it is necessary to adjust several potentiometers and timing modules to accomplish the proper timing signal placement. To generate a first facet synch signal, a mono-stable multi-vibrator (one-shot) with associated RC timing network has been used which required manual intervention and the use of an oscilloscope to ensure proper placement of the one shot. It was necessary to observe the timing relationship between the polygon index signal, facet synch signal and line start signals. To generate successive facet synch pulses, a second mono-stable multi-vibrator with associated RC timing network had to be adjusted in a similar fashion. Thus, is was necessary to observe the timing relationship between line start signals and successive facet synch signals. This sequence of steps is relatively labor intensive.

The present invention replaces the labor intensive set-up sequence of the prior art and provides an automatic method for setting up and running the printing device.

SUMMARY OF THE INVENTION

In one aspect of the present invention there is provided a method for controlling the operation of a printer for use in exposing a photosensitive material. The printer has a rotatable polygon mirror having a plurality of adjacent facets, including a reference facet. A polygon index signal is generated in response to rotation of the mirror and defines a reference position for the reference facet. A light source is also provided for directing a light beam at the polygon mirror for reflection off each of the adjacent facets for exposing a photosensitive material. A writing path is defined by the light beam in response to rotation of the polygon mirror. A sensor is positioned in the writing path for defining a reference position and provides a line start signal for each of the facets in response to the light beam passing over the sensor. The method comprises the steps of:

a) placing the printer in a first set-up mode;
b) rotating the rotatable polygon mirror;
c) turning on the light source;
d) measuring a first time period $T_S$ from the polygon index signal to a first line start signal provided by the reference facet;
e) measuring a second time period $T_{LS}$ from a line start signal to the next line start signal generated from the next adjacent facet of the rotatable polygon mirror;
f) determining a first facet synch signal $T_{RI}$ using the first time period $T_S$ from the reference facet;
g) storing the $T_{RI}$ and $T_{LS}$ determined from the forgoing steps;
h) placing the printer in a writing mode for writing onto the photosensitive material using the light beam;
i) placing the light beam initially in the off state;
j) turning on the light source to a first power excitation level in response to the first facet synch signal for the facet, the first power excitation level being sufficient for causing the sensor to generate the first line start signal;
k) initiating writing of a line of an image on the photosensitive material at a predetermined time period after the first line start signal by turning the light source on and modulating the light beam in accordance with digital image data for the line of image;
l) terminating writing of the line of image by turning off the light source when the image data for the line of image ends;
m) rotating the polygon mirror to the next adjacent facet and using $T_{LS}$ for generating the next facet synch signal for tuning on the light source at the first excitation level for generating the next line start signal; and
n) repeating k, l, and m until the next polygon index signal is generated and then repeating steps i, j, k, l, and m.

In another aspect of the present invention there is provided a printer for use in exposing a photosensitive material, the apparatus comprising:

a rotatable polygon mirror having a plurality of adjacent facets, the plurality of adjacent facets including a reference facet, means for generating a polygon index signal which defines a reference position for the reference facet, a light source for directing a light beam at the polygon mirror for refection off each of the adjacent facets for exposing the photosensitive material, the light beam defining a writing path for the plurality of facets in response to rotation of the polygon mirror, and a sensor for providing a line start signal for each of the facets in response to the light beam passing over the sensor, means for placing the printer in a set-up or writing mode;

means for measuring a first time period $T_S$ from the polygon index signal to a first line start signal provided by the reference facet;

measuring a second time period $T_{LS}$ from the first line start signal to the next line start signal generated from the next adjacent facet of the rotatable polygon mirror;

means for determining a first facet synch signal $T_{RI}$ using the first time period $T_S$ from the reference facet;

means for storing the values for $T_{RI}$ and $T_{LS}$;

means for turning on and off the light source in a controlled manner;

means for turning on the light source to a first power excitation level in response to the first facet synch signal for the facet, the first power excitation level being sufficient for causing the sensor to generate the first line start signal;

means for initiating writing of a line of an image on the photosensitive material at a predetermined time period after the first line start signal by turning the light source on and modulating the light beam in accordance with digital image data for the line of image; and means for terminating writing of the line of image by turning off the light source when the image data for the line of image ends.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or cooperating more directly with, apparatuses in accordance with the present invention. It is to be understood that elements not specifically shown or described may take various forms as is well known to those skilled in the art. While the present invention is described below in the environment of a digital laser printer, it will be noted that the invention can be used with other types of scanners and/or printing devices.

Figure 1:
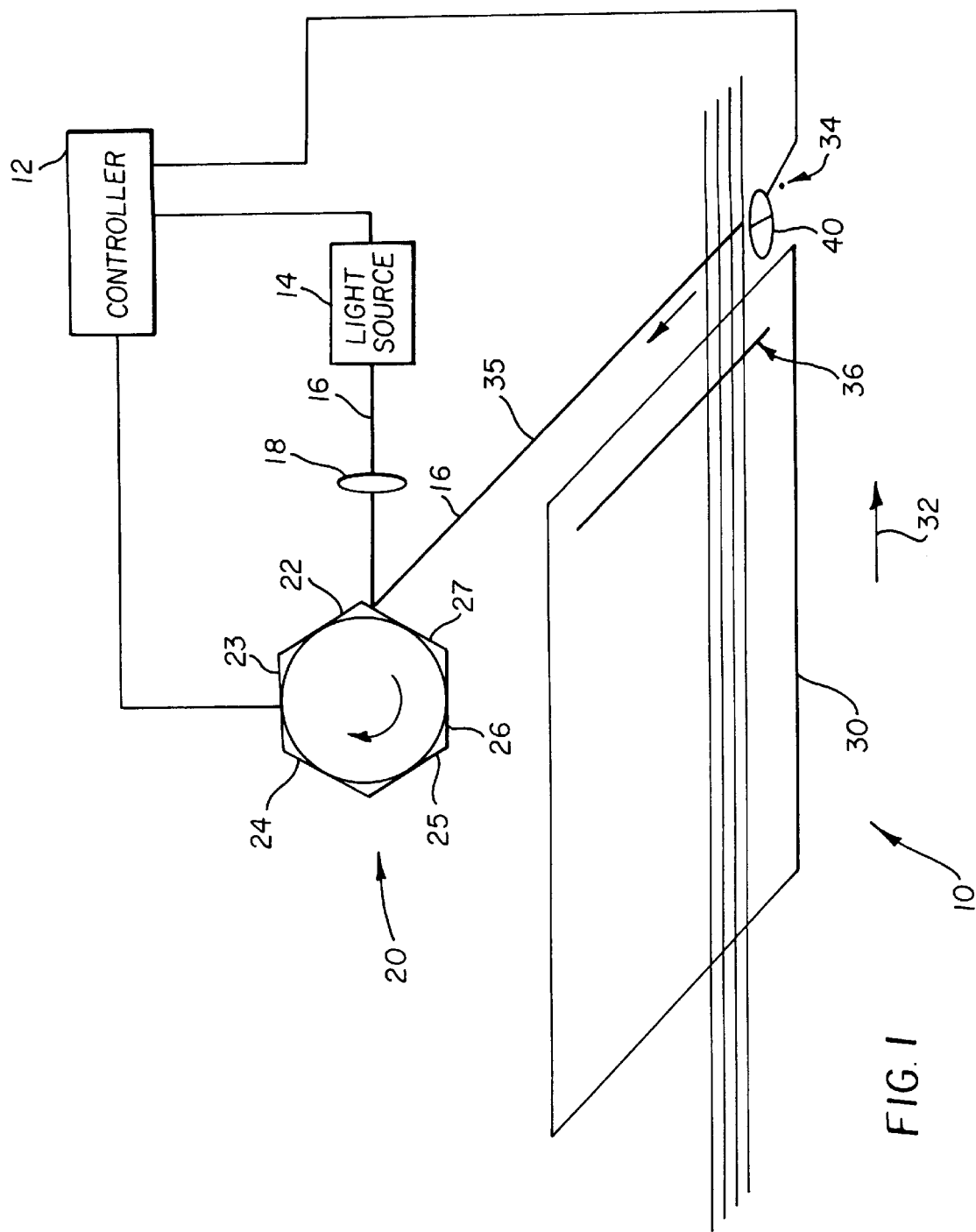
FIG. 1 illustrates schematically a printer according to the present invention.

Referring to FIG. 1, there is illustrated a printer 10 made in accordance with the present invention. Printer 10 includes a controller 12 for controlling operation of the printer 10. The controller 12 typically takes the form of a computer and associated components and circuits, and is appropriately connected to the various components of the printer 10 for obtaining information, monitoring operation, and controlling operation thereof. Printer 10 includes a light source 14 which is used to produce a light beam 16. In the preferred embodiment illustrated, the source of light source 14 is a laser. However, it is to be understood that any other coherent light may be used that can provide a light beam for scanning onto a photosensitive material. The printer 10 further includes optics 18, which in the present invention includes an f-θ lens for focusing of the beam 16 onto a polygon mirror 20 having a plurality of adjacent facets 22, 23, 24, 25, 26, 27 for reflecting of the beam 16 onto a photosensitive medium 30. The medium may be any desired type of photosensitive medium upon which writing can occur. In the particular embodiment illustrated, the photosensitive medium 30 comprises a photographic paper, however, such photosensitive material may be photographic film, thermal paper, or any type photosensitive medium that is currently used or may be developed in the future. Appropriate mechanisms are provided (not shown) for moving of the medium 30 in the direction indicated by arrow 32 as is well known in the art. As polygon mirror 20 is rotated, the beam will be scanned from a point 34 to a second point 35 for producing a writing path 36. A sensor 40 is placed in the writing path 36 such that as the polygon mirror 20 is rotated, the beam 16 will scan across the sensor 40 in the beginning part of each facet. The sensor 40 is used to produce a line start signal which is forwarded to the controller 12. The controller 12 also controls the light source 14 so as to provide proper activation for writing on the medium 30. In order to minimize the amount of unnecessary light generated by the light source 14 when the light beam is not writing on the medium 30, it is desirable to have the light turn on just prior to generating the line start signal. In order to do this, it is important to properly activate the source just prior to reaching the sensor 40.

Figure 2:
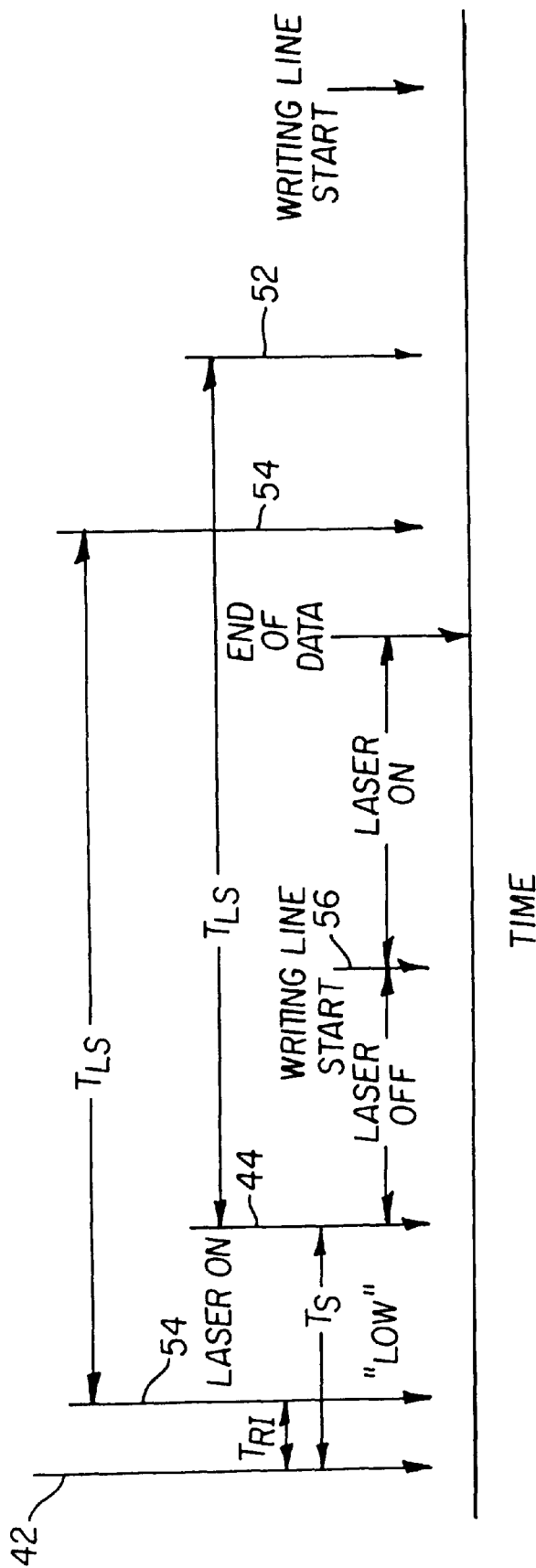
FIG. 2 is a time chart illustrating the generation of various signals produced by the rotation of a polygon mirror in the set-up mode.
Figure 3:
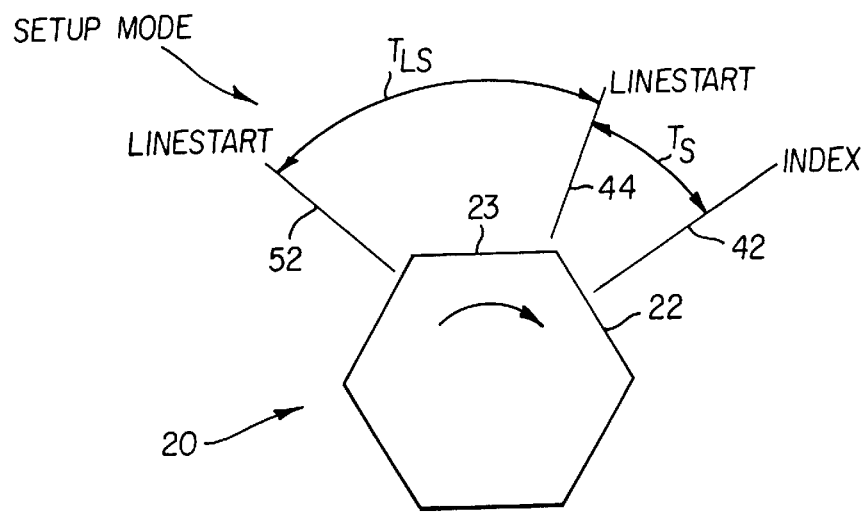
FIG. 3 is a diagrammatic illustration of the polygon mirror of the printer of FIG. 1 showing various signal generated with respect to the position of the mirror.
Figure 5:
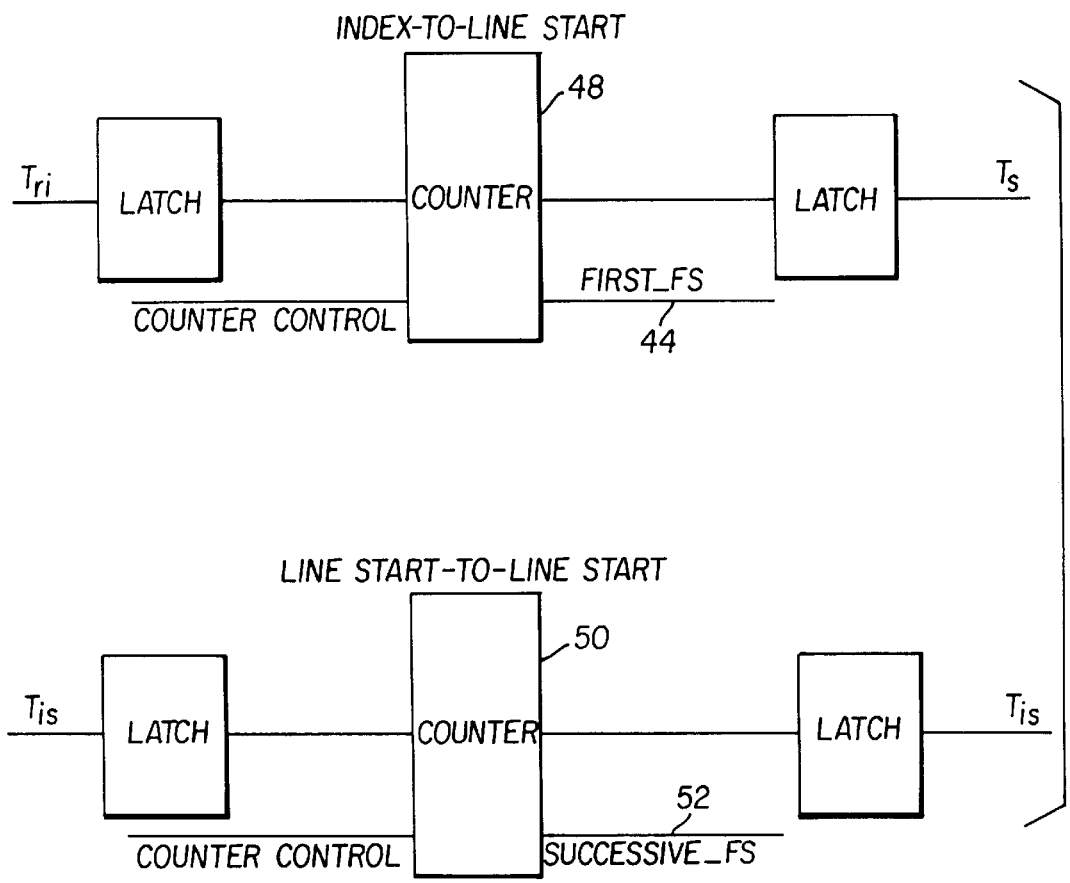
FIG. 5 is a diagrammatic representation of the counters provided in the controller used in the set-up mode and writing mode.

Applicants have found a method where this can be done automatically by the apparatus utilizing a pair of counters. This is accomplished by first placing the printer 10 in a set-up mode. FIGS. 2 and 3 illustrate the various signal produced during rotation of the polygon mirror 20. The polygon mirror 20 is provided with means for providing a polygon index signal 42 when a reference facet, which in the present embodiment illustrated is facet 22, is rotated at a particular position during each revolution. It is to be understood that any mechanism 43, switch, or other device may be used to produce the polygon index signal as is currently done in the prior art, or may be developed. During the set-up mode, polygon index signal 42 is produced when the reference facet 22 passes a predetermined position, as illustrated in FIG. 1. When the beam 16 crosses sensor 40, a first line start signal 44 is produced. As the next adjacent facet 23 is rotated into position such that the beam 16 traverses the facet, the beam 16 will again traverse and pass over sensor 40 to generate a second line start signal 52. As the mirror 20 is being rotated, counter 48 (see FIG. 5) provided in controller 12 measures the time from the polygon index signal 42 generated to the first line start signal 44 produced by the beam 16 passing sensor 40. The time $T_S$ is obtained through the use of counter 48. A second counter 50, also provided in controller 12 (see FIG. 5), is used to measure the time from the first line start signal 44 to a second line start signal 52 for the adjacent facet 23. This time $T_{LS}$ is stored. Since the time between the polygon index signal 42 and the first line start signal 44 is known, a time period $T_{RI}$ can be determined between the polygon index signal 42 to the first facet synch signal 54. The time period $T_{RI}$ is stored in the computer memory of controller 12. This information is used for generating the first facet synch signal 54 which can be generated for activation of the light source 14 just prior to reaching the sensor 40 so that the appropriate line start signal can be generated by sensor 40. However, during this time period, the light source 14 only need be turned on to a level sufficient to activate the sensor 40 so as to generate an appropriate line start signal at which time the light source 14 may be turned off until an appropriate start-of-scan signal 56 is provided for generating digital data in the form of an image onto the medium 30. Once the first line start signal 44 has been determined for reference facet 22, and since the time $T_{LS}$, the time from the first line start signal 44 to the second line start signal 52, is easily determined by counter 50, successive facet synch signals for successive facets can be generated for activating of the light source 14 just prior to the light beam 16 reaching sensor 40 for generating the appropriate signals 52 used during the writing mode.

Figure 4:
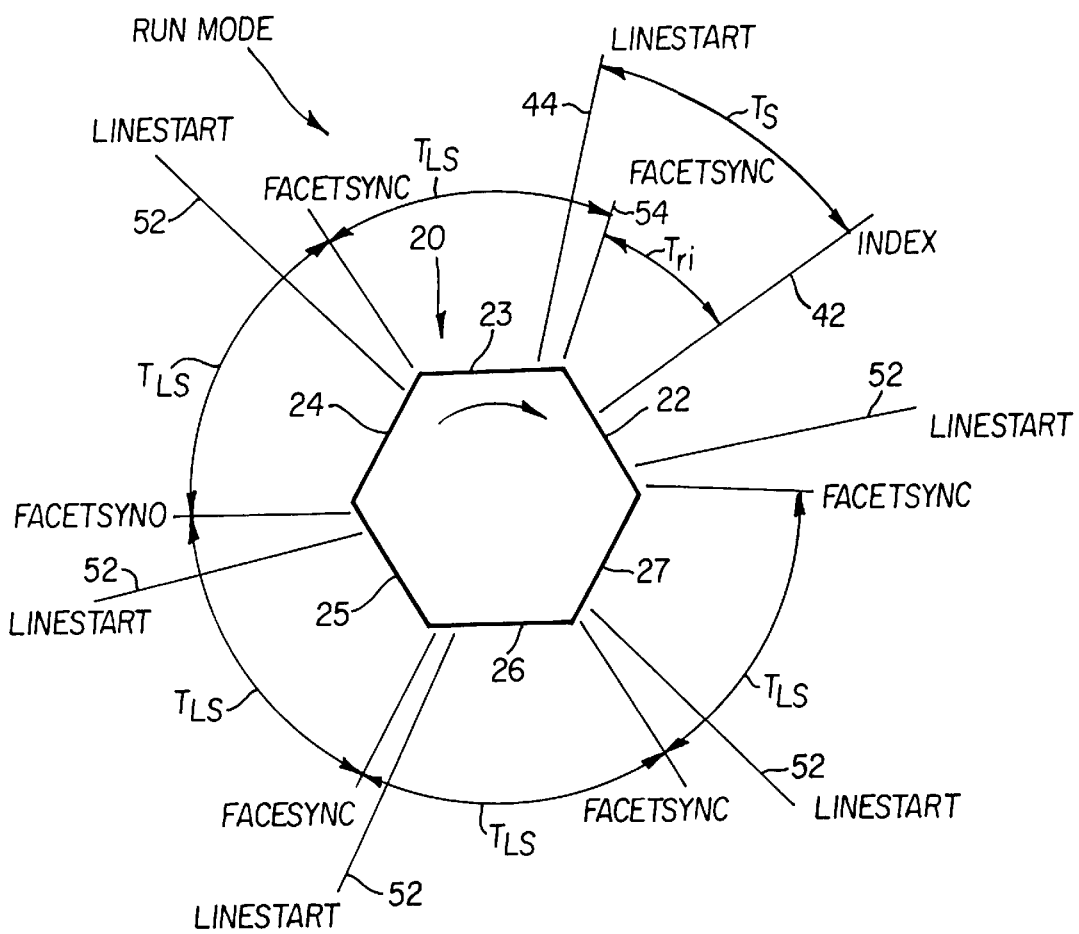
FIG. 4 is a diagrammatic illustration similar to FIG. 3 illustrating the printer in the writing mode.

Having determined $T_{LS}$ and $T_{RI}$, the printer 10 can be placed in the writing mode. FIG. 4 illustrates the various signals generated during rotation of the mirror 20. In order to more clearly understand the operation of the printer 10, a description of one rotation of the polygon mirror 20 will be discussed, it being understood that subsequent revolutions operate in a similar manner. During rotation, as illustrated by FIG. 4, a polygon index signal 42 is generated and sent to controller 12 which starts counter 48 running. The counter 48 counts the time period of $T_{RI}$ after which a first facet synch signal 54 is generated which starts counter 50 running and causes the light source 14 to be activated so as to produce light beam 16. When the beam 16 crosses the sensor 40, a line start signal 44 is generated. The start-of-scan signal is generated by controller 12 which causes a line of data to be printed on the medium 30. After the data for the line is completed, the light source 14 is turned off. The stored time $T_{LS}$ is used to generate successive facet synch signals for each of the facets 23, 24, 25, 26, 27. Each successive line start signal for the successive facets are generated by the beam 16 passing sensor 40. The next polygon index signal is generated at the beginning of the next revolution and the process is used to generate the first facet synch signal and the process is repeated. The printer 10 continues to operate in this way until it is necessary to recalibrate the printer 10 in which case the printer will go through the procedure previously discussed and described with respect to FIG. 3. This recalibration mode may be conducted after each printing job, or once a day when the device is turned on. It is, of course, understood that the recalibration may occur as frequently as desired, but typically recalibration is needed only when a polygon is replaced.

The invention has been described in detail with particular reference to certain preferred embodiments thereof, but it will be understood that variations and modifications can be effected within the scope of the invention.

PARTS LIST 10 printer
12 controller
14 light source
16 light beam
18 optics
20 polygon mirror
22 facet
23 facet
24 facet
25 facet
26 facet
27 facet
30 medium
32 arrow
34 point
35 point
36 writing path
40 sensor
42 polygon index signal
44 first line start signal
48 counter
50 counter
52 second line start signal
54 first facet synch signal
56 start-of-scan signal

What is claimed is:

1. A method for controlling the operation of a printer for use in exposing a photosensitive material, said printer having a rotatable polygon mirror having a plurality of adjacent facets, said plurality of adjacent facets including a reference facet, means for generating a polygon index signal which defines a reference position for said reference facet, a light source for directing a light beam at said polygon mirror for reflection off each of said adjacent facets for exposing said photosensitive material, said light beam defining a writing path for said plurality of facets in response to rotation of said polygon mirror, and a sensor positioning in said writing path defining a reference position, said sensor providing a line start signal for each of said facets in response to said light beam passing over said sensor, said method comprising the steps of:

a) placing said printer in a first set-up mode;
b) rotating said rotatable polygon mirror;
c) turning on said light source;
d) measuring a first time period $T_S$ from said polygon index signal to a first line start signal provided by said reference facet;
e) measuring a second time period $T_{LS}$ from a line start signal to the next line start signal generated from the next adjacent facet of said rotatable polygon mirror;
f) determining a first facet synch signal $T_{RI}$ using said first time period $T_S$ from said reference facet;
g) storing said values for $T_{RI}$ and $T_{LS}$ determined from the forgoing steps;
h) placing said printer in a writing mode for writing onto said photosensitive material using said light beam;
i) placing said light beam initially in the off state;
j) turning on said light source to a first power excitation level in response to said first facet synch signal for said facet, said first power excitation level being sufficient for causing said sensor to generate said first line start signal;
k) initiating writing of a first line of an image on said photosensitive material at a predetermined time period after said line start signal by turning said light source on and modulating the light beam in accordance with digital image data for said line of image;
l) terminating writing of said line of image by turning off said light source when the image data for said line of image ends;
m) rotating said polygon mirror to the next adjacent facet and using $T_{LS}$ for generating the next facet synch signal for tuning on the light source at the first excitation level for generating the next line start signal;
n) repeating steps k, l, and m until the next polygon index signal is generated and then repeating steps i, j, k, l, and m.

2. A method according to claim 1 wherein said light source is a laser.

3. A printer for use in exposing a photosensitive material, said printer comprising:

a rotatable polygon mirror having a plurality of adjacent facets, said plurality of adjacent facets including a reference facet, means for generating a polygon index signal which defines a reference position for said reference facet, a light source for directing a light beam at said polygon mirror for reflection off each of said adjacent facets for exposing said photosensitive material, said light beam defining a writing path for said plurality of facets in response to rotation of said polygon mirror, and a sensor for providing a line start signal for each of said facets in response to said light beam passing over said sensor, means for placing said printer in a set-up or writing mode, and a controller for controlling operation of said printer, said controller having a counter for measuring a first time period $T_S$ from said polygon index signal to a first line start signal provided by said reference facet and for measuring a second time period $T_{LS}$ from the first line start signal to the next line start signal generated from the next adjacent facet of said rotatable polygon mirror, said controller determining a first facet synch signal $T_{RI}$ using said first time period $T_S$ from said reference facet and storing said $T_{RI}$ and $T_{LS}$, said controller turning on and off said light source in a controlled manner and turning on said light source to a first power excitation level in response to said first facet synch signal for said reference facet, said first power excitation level being sufficient for causing said sensor to generate said first line start signal, said controller initiating writing of a line of an image on said photosensitive material at a predetermined time period after said line start signal by turning said light source on and modulating the light beam in accordance with digital image data for said line of image and terminating writing of said line of image by turning off said light source when the image data for said line of image ends.

4. A printer for use in exposing a photosensitive material, said apparatus comprising:

a rotatable polygon mirror having a plurality of adjacent facets, said plurality of adjacent facets including a reference facet, a mechanism for generating a polygon index signal which defines a reference position for said reference facet, a light source for directing a light beam at said polygon mirror for reflection off each of said adjacent facets for exposing said photosensitive material, said light beam defining a writing path for said plurality of facets in response to rotation of said polygon mirror, a sensor for providing a line start signal for each of said facets in response to said light beam passing over said sensor, means for placing said printer in a set-up or writing mode, and a controller for controlling operation of the printer;

means for measuring a first time period $T_S$ from said polygon index signal to a first line start signal provided by said reference facet;

means for measuring a second time period $T_{LS}$ from a line start signal to the next line start signal generated from the next adjacent facet of said rotatable polygon mirror;

means for determining a first facet synch signal $T_{RI}$ using said first time period $T_S$ from said reference facet;

means for turning on said light source for a first predetermined time period to a first power excitation level in response to said first facet synch signal for said reference facet, said first power excitation level being sufficient for causing said sensor to generate said first line start signal;

means for initiating writing of a line of an image on said photosensitive material for a second predetermined time period after said first line start signal by turning said light source on and modulating the light beam in accordance with digital image data for said line of image; and means for terminating writing of said line of an image by turning off said light source when the image data for said line of image ends.

5. A printer according to claim 4 wherein said means for measuring $T_{LS}$ and $T_S$ comprise a counter.

* * * * *

UNITED STATES PATENT AND TRADEMARK OFFICE
CERTIFICATE OF CORRECTION

PATENT NO. : 6,055,010
DATED : April 25, 2000
INVENTOR(S) : Thomas L. Rockwell, et al It is certified that error appears in the above-identified patent and that said Letters Patent is hereby corrected as shown below:

Col. 6, line 31, after "said" insert -- first --

Signed and Sealed this

Fifteenth Day of May, 2001

Attest:

NICHOLAS P. GODICI

*Attesting Officer*     Acting Director of the United States Patent and Trademark Office